(12) United States Patent
Yang et al.

(10) Patent No.: US 9,137,454 B2
(45) Date of Patent: Sep. 15, 2015

(54) METHOD OF FILMING HIGH DYNAMIC RANGE VIDEOS

(71) Applicant: Quanta Computer Inc., Tao Yuan Shien (TW)

(72) Inventors: Wen-Chu Yang, New Taipei (TW); Keng-Sheng Lin, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 0 days.

(21) Appl. No.: 14/076,440

(22) Filed: Nov. 11, 2013

(65) Prior Publication Data

US 2015/0029354 A1    Jan. 29, 2015

(30) Foreign Application Priority Data

Jul. 29, 2013 (TW) ................ 102127216 A

(51) Int. Cl.
*H04N 5/235* (2006.01)
(52) U.S. Cl.
CPC .................... *H04N 5/2355* (2013.01)
(58) Field of Classification Search
None
See application file for complete search history.

(56) References Cited

U.S. PATENT DOCUMENTS

| | | | | |
|---|---|---|---|---|
| 2009/0262215 | A1* | 10/2009 | Sano et al. | 348/229.1 |
| 2010/0309333 | A1* | 12/2010 | Smith et al. | 348/230.1 |
| 2014/0184894 | A1* | 7/2014 | Motta | 348/362 |

FOREIGN PATENT DOCUMENTS

| | | |
|---|---|---|
| CN | 102970488 A | 3/2013 |
| JP | 2007251905 | 9/2007 |
| JP | 2008228058 | 9/2008 |

OTHER PUBLICATIONS

Paul E. Debevec and Jitendra Malik, "Recovering High Dynamic Range Radiance Maps from Photographs" In SIGGRAPH 97, Aug. 1997.
Japan Office Action dated Sep. 9, 2014.
English translation of abstract of JP 2008228058 (published Sep. 25, 2008).
English translation of abstract of JP 2007251905 (published Sep. 27, 2007).
Office Action received in corresponding Taiwan patent application (May 20, 2015).

* cited by examiner

*Primary Examiner* — Roberto Velez
*Assistant Examiner* — Yih-Sien Kao
(74) *Attorney, Agent, or Firm* — McClure, Qualey & Rodack, LLP

(57) ABSTRACT

The present invention discloses a method of filming a high dynamic range video. The method includes: using an image sensor to capture an original frame which is interlaced by a plurality of long exposure areas and a plurality of short exposure areas; forming a long exposure field via a plurality of long exposure areas and forming a short exposure field via a plurality of short exposure areas; forming a reconstructed long exposure field and a reconstructed short exposure field having the same resolution as the original frame via a reconstruction process by a pixel value of each pixel in the long exposure field and the short exposure field; and forming a high dynamic range image based on the pixel value of each pixel of the reconstructed long exposure field and the reconstructed short exposure field via a merging process.

9 Claims, 7 Drawing Sheets

METHOD OF FILMING HIGH DYNAMIC RANGE VIDEOS

CROSS-REFERENCE TO RELATED APPLICATION

This application claims priority from Taiwan Patent Application No. 102127216, filed on Jul. 29, 2013 in Taiwan Intellectual Property Office, the contents of which are hereby incorporated by reference in their entirety.

BACKGROUND OF THE INVENTION

1. Field of the Invention

Embodiments of the present invention are related to a method of filming a high dynamic range video, and particularly related to a method of using an alternating-row image sensor to acquire exposure information of two different exposure durations from a single picture, and merging the exposure information of two different exposure durations to form a high dynamic range image.

2. Description of the Related Art

The dynamic range (the ratio between the largest to the smallest illuminance value) of contemporary consumer digital cameras or webcams is around 400. However, most of the dynamic ranges of indoor scenes exceed 1500, while the dynamic ranges of outdoor scenes usually reaches up to $10^5$. Therefore, the present equipments can merely capture partial illuminance information of scenes, that is, the present equipments are unable to capture all the illuminance information of scenes.

To solve the aforementioned problem, P. E. Debevec proposed the technology of the high dynamic range image to merge a plurality of images of different exposure time in 1997, "Paul E. Debevec, Jitendra Malik, *Recovering High Dynamic Range Radiance Maps from Photographs*, SIGGRAPH 1997." However, the kind of technology is limited to apply to static images. Because once objects within two images somewhat shift, the merging images will generate the ghost effect phenomenon, as shown in FIG. 1.

SUMMARY OF THE INVENTION

The present invention discloses a method of filming high dynamic videos by using an alternating-row image sensor to acquire the exposure information of a single frame in different exposure time simultaneously, then the two exposure information can be merged together. Therefore, the method of the present invention will not generate the ghost effect phenomenon. It is noteworthy to note that the present method has the feature of low computation, that is, a user may display the shooting high dynamic range image in real time.

Based on the purpose of the present invention, a method of filming a high dynamic range video is disclosed, including the following steps: using the alternating-row image sensor to shoot an original image which is interlaced by a plurality of long exposure areas and a plurality of short exposure areas, and the original image including a plurality of pixels; forming the plurality of long exposure areas as a long exposure field and forming the plurality of short exposure areas as a short exposure field; forming a reconstructed long exposure field and a reconstructed short exposure field having the same resolution as the original image based on a pixel value of each pixel of the long exposure field and the short exposure field via a reconstruction process; and applying the pixel value of each pixel of the reconstructed long exposure field and the reconstructed short exposure field to form a high dynamic range image via a merging process, where the pixel value is an integer within 0 to $2^x-1$ and x is a number of digits of the image sensor, different pixel values correspond to different levels of illuminance, and a ratio of a long exposure duration of the plurality of long exposure area to a short exposure duration of the plurality of short exposure area is defined as a exposure duration ratio (R).

According to the above, the alternating-row image sensor is been utilized in the method of filming high dynamic videos of the present invention to shoot the interlaced original image of the long exposure area and the short exposure area, the reconstruction process is been used to patch up the missing parts of the reconstructed long exposure field and the reconstructed short exposure field, and the merging process is been used to merge the reconstructed long exposure field and the reconstructed short exposure field to form the high dynamic range image. By using image reconstruction, the present invention is able to solve the common image quality downgrade problem caused by the image resolution reduced into a half when adopting the alternating-row image sensor.

DETAILED DESCRIPTION OF THE PREFERRED EMBODIMENTS

To illustrate the characteristics, content, and advantages of the present invention and the effects it can fulfill, a preferred embodiment and the corresponding drawings are provided to offer more detailed descriptions. The purpose of the drawings being used is for illustration and to assist the specifications, they are not necessarily the real proportion and precise allocations of the embodiments of the present invention. Thus, they should not be used to limit the privilege coverage of the practical embodiments of the present invention.

In the present invention a method of filming a high dynamic range video is disclosed to provide a user with an original image having a plurality of long exposure areas and a plurality of short exposure areas by an alternating-row image sensor. The image information acquired in the long exposure areas is used to provide darker parts of a scene in a reconstruction process, while the image information acquired in the short exposure area is used to provide brighter parts of the scene in the reconstruction process. Afterward, a high dynamic range image is generated via the reconstruction process and a merging process to prevent the shortcoming of image quality downgrade. Besides, the present method has the feature of low computation. Therefore, the user may display the shooting high dynamic range image in real time.

The method of filming high dynamic range videos of the present invention may apply to any electronic product having an image sensor, for example, cell phones, digital cameras, tablet computers, and notebook computers.

Figure 1:
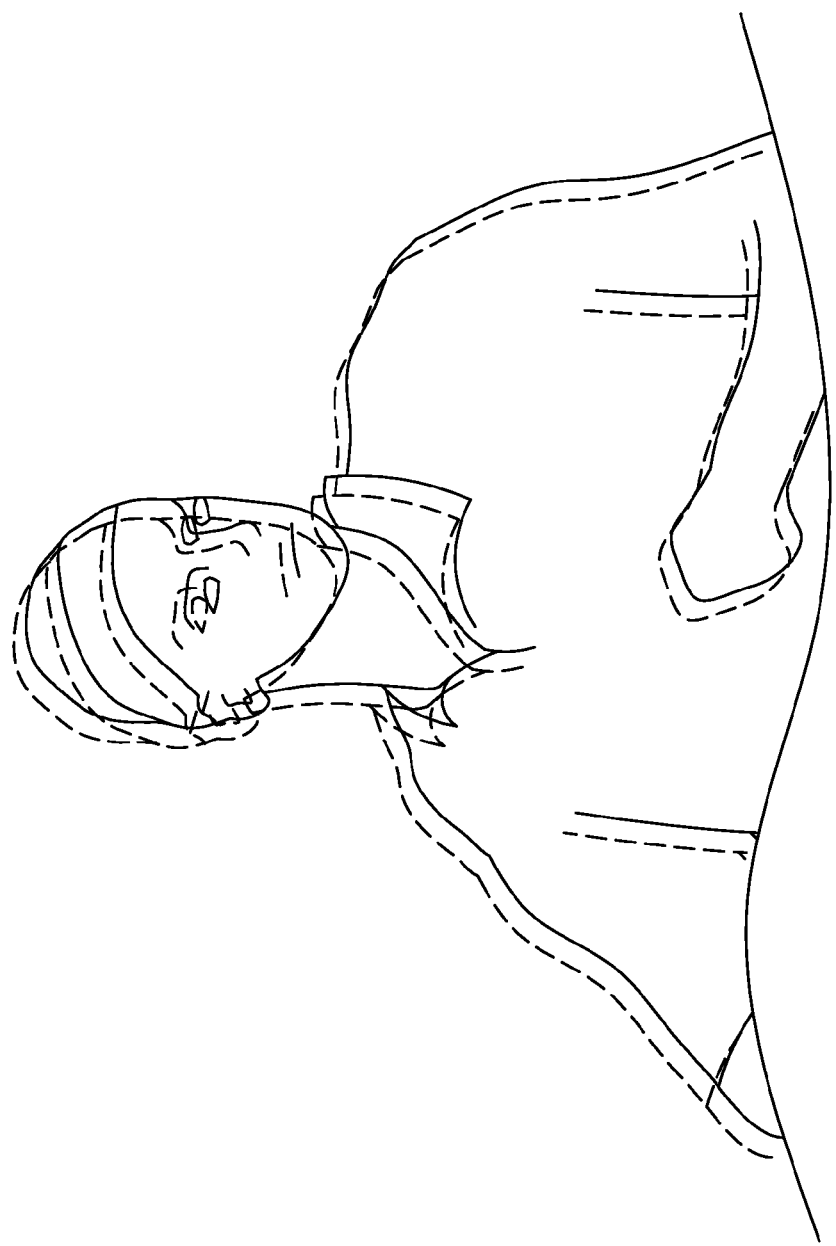
FIG. 1 is a diagram showing generation of a ghost effect phenomenon according to a method of prior arts.
Figure 2:
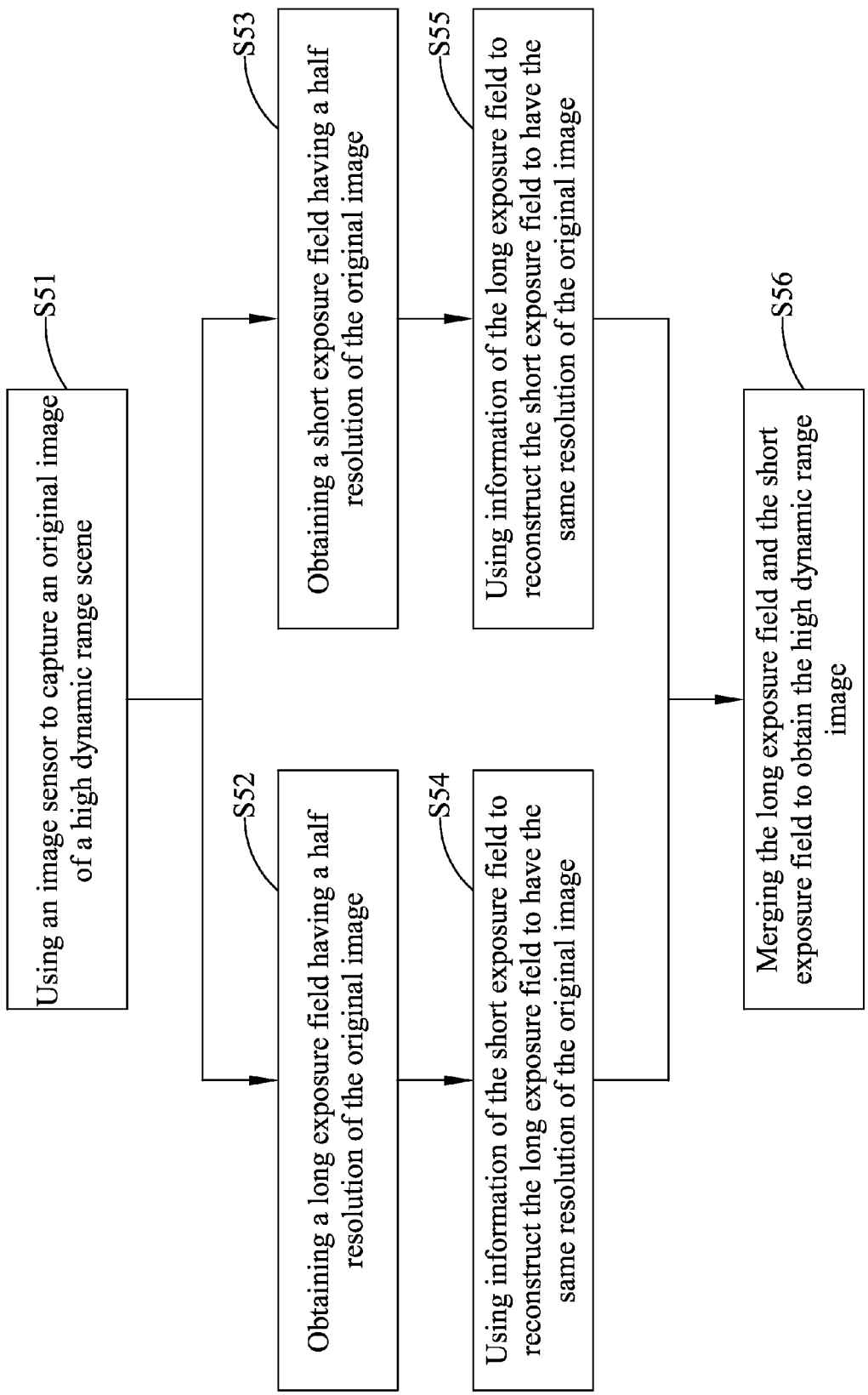
FIG. 2 is a flow diagram showing the method of filming high dynamic range videos according to a first embodiment of the present invention.

FIG. 2 is a flow diagram showing the method of filming high dynamic range videos according to a first embodiment of the present invention. The flow of the method may include the following steps:

S51: Using an image sensor to capture an original image of a high dynamic range scene.

S52: Obtaining a long exposure field having a half resolution of the original image.

S53: Obtaining a short exposure field having a half resolution of the original image.

S54: Using information of the short exposure field to reconstruct the long exposure field to have the same resolution of the original image.

S55: Using information of the long exposure field to reconstruct the short exposure field to have the same resolution of the original image.

S56: Merging the long exposure field and the short exposure field to obtain the high dynamic range image.

In the present invention, the alternating-row image sensor is used to acquire the original image of the high dynamic range scene. The alternating-row image sensor may be a Bayer Pattern image sensor, whose first row and second row can be set up to have longer exposure time to capture the image information for reconstructing the low illuminance parts of the image scene, and whose third row and fourth row are set up to have shorter exposure time to capture the image information for reconstructing the high illuminance parts of the image scene, so on and so forth. Therefore, the original image comprises a plurality of long exposure area having a half of resolution of the original image (i.e. the long exposure field having a half resolution) and a plurality of short exposure area having a half of resolution of the original image (i.e. the short exposure field having a half resolution). Afterward, the reconstruction process includes using the information of the short exposure areas to fill up the missing parts of the long exposure areas to form the long exposure field having the same resolution as the original image, and also using the information of the long exposure areas to fill up the missing parts of the short exposure areas to form the short exposure field having the same resolution as the original image. Finally, the merging process includes merging the information of the long exposure field with that of the short exposure field to obtain the high dynamic range image.

Figure 3:
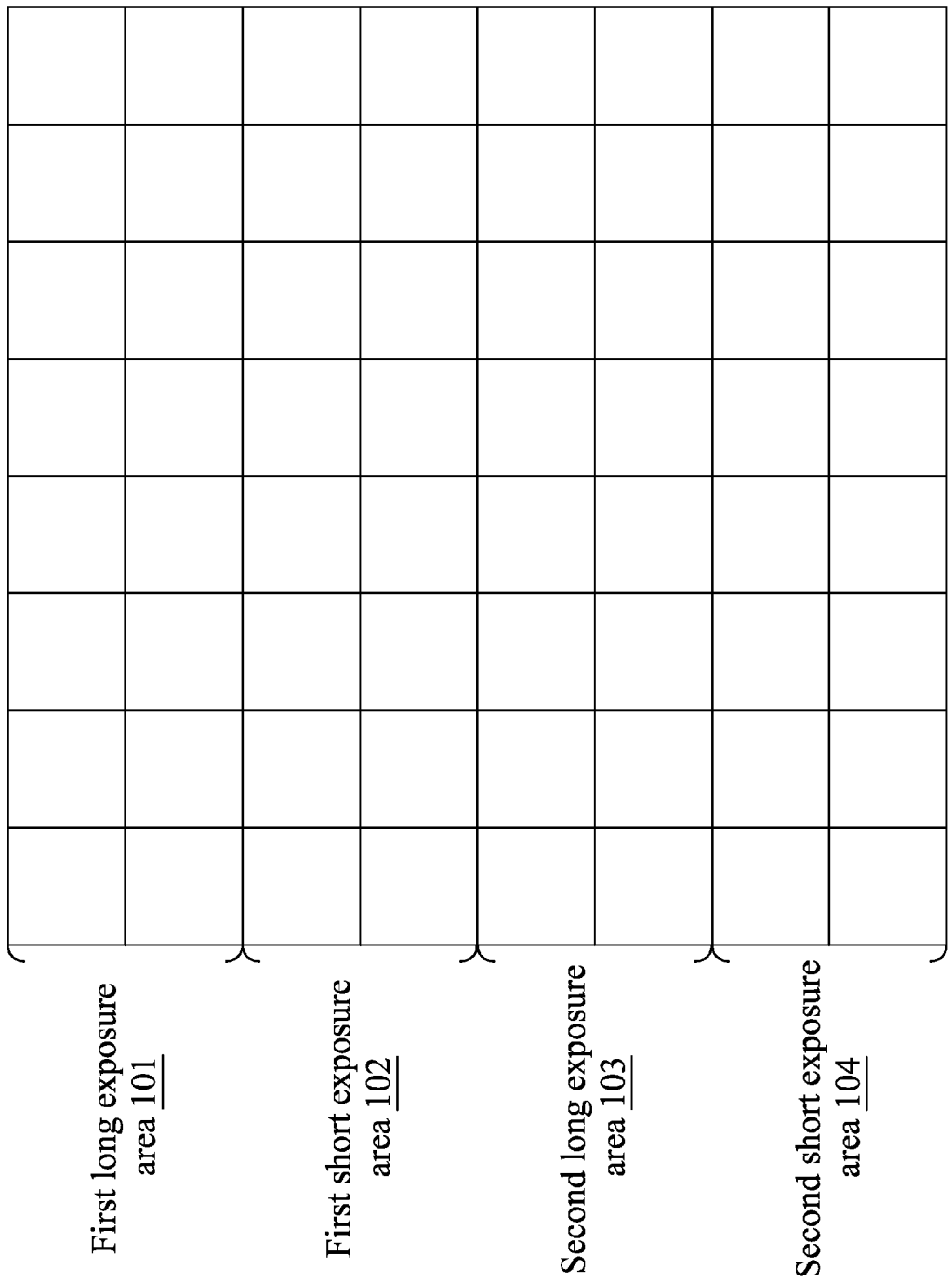
FIG. 3 is a diagram showing an original image of a high dynamic range scene shot by an alternating-row image sensor, according to the first embodiment of the present invention.

FIG. 3 is a diagram showing an original image of a high dynamic range scene shot by an alternating-row image sensor, according to the first embodiment of the present invention. To make the following explanation easier to understand, an image of 8×8 resolution is adopted for illustration. Therefore, the original image is constructed by interlacing the first long exposure area 101, the first short exposure area 102, the second long exposure area 103, and the second short exposure area 104. It is noteworthy to mention that not every exposure area needs to have two consecutive rows of image sensing units, it can also be set up that the first row has a longer exposure time, the second row has a shorter exposure time, the third row has a longer exposure time, the fourth row has a shorter exposure time, and so on to capture the original image. Besides, at least one row of lateral image sensing units are used as an exposure area in the present embodiment. However, the present invention is not limited thereof. The exposure area can also be defined as the longitudinal image sensing units, for example, the first column and the second column have longer exposure time, while the third row and the fourth row have shorter exposure time.

Figure 4:
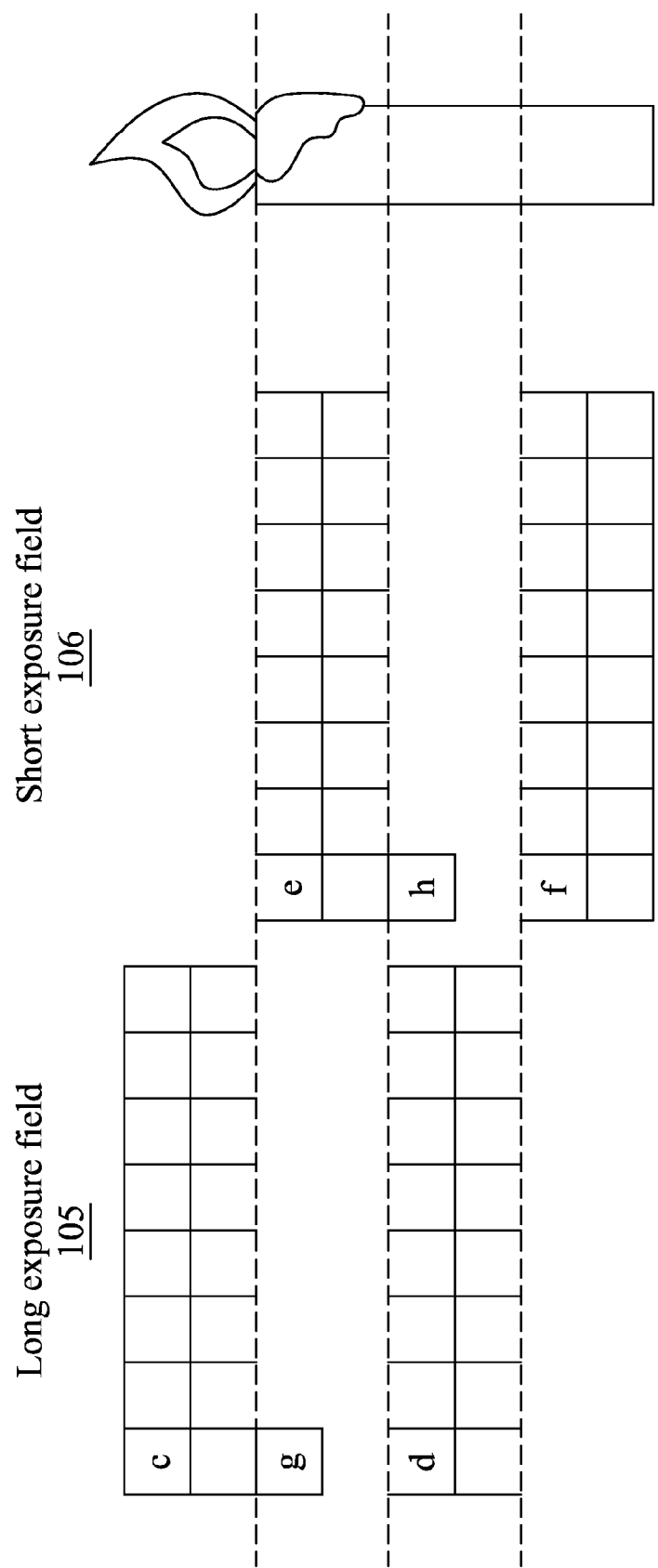
FIG. 4 is a diagram showing a long exposure field and a short exposure field according to the first embodiment of the present invention.

FIG. 4 is a diagram showing a long exposure field and a short exposure field according to the first embodiment of the present invention. Referring to FIG. 3 and FIG. 4, the long exposure field 105 may include the first long exposure area 101 and the second long exposure area 103, and the short exposure field 106 may include the first short exposure area 102 and the second short exposure area 104. As shown in FIG. 4, the long exposure field 105 and the short exposure field 106 capture different parts of the scene, respectively.

Figure 5:
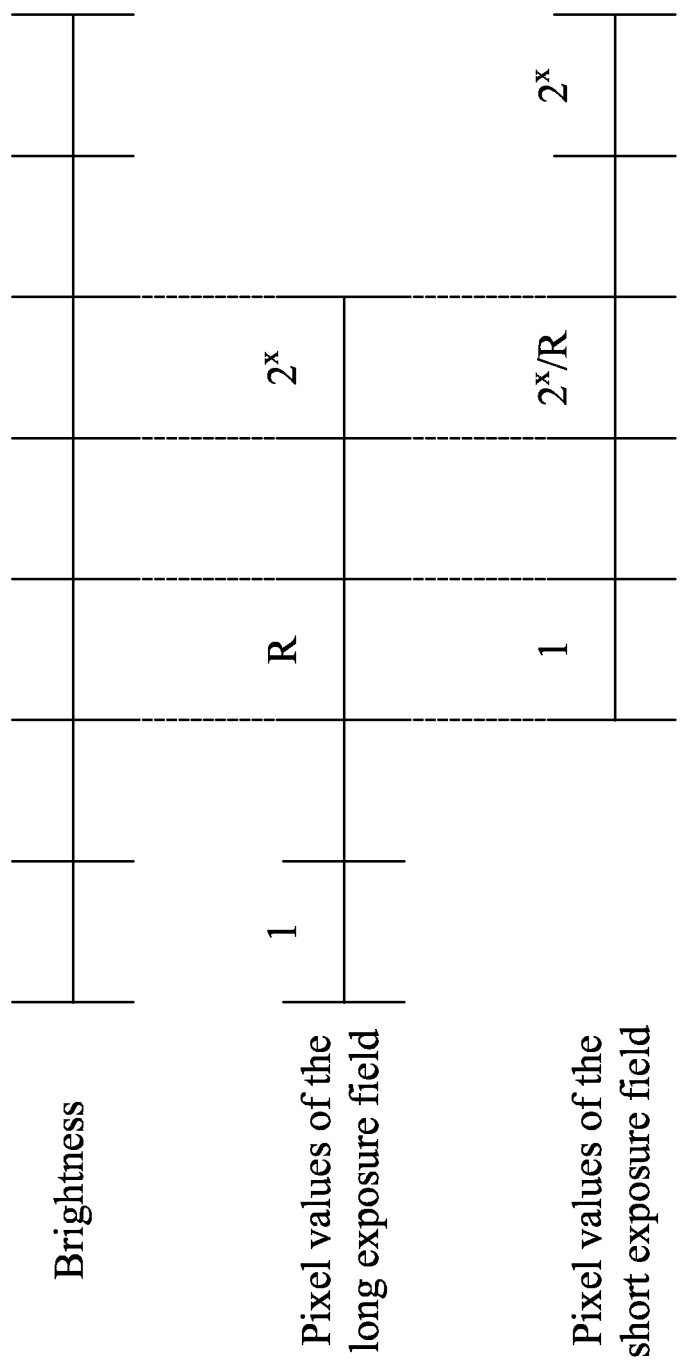
FIG. 5 is a diagram showing illuminance mapping to pixels of the long exposure field and the short exposure field according to the first embodiment of the present invention.

FIG. 5 is a diagram showing illuminance mapping to pixels of the long exposure field and the short exposure field according to the first embodiment of the present invention. A light source of a certain illuminance will generate different pixel values under different exposure time. Suppose x is the digits of the image sensor, then the pixel value can be any integer between 0 and $2^x-1$. In addition, define the ratio between the exposure time of the long exposure field to the exposure time of the short exposure field as an exposure time ratio (R). For the same light source, the pixel values of the image captured in the long exposure field and the short exposure field present R times of difference. In the present embodiment, for example, suppose the pixel value of the long exposure field is R, then the pixel value of the short exposure field is 1 under the same illuminance; suppose the pixel value of the long exposure field is $2^x$, then the pixel value of the short exposure field is $2^x/R$ under the same illuminance. It is noteworthy to mention that, in FIG. 5, the dark areas of the image exceed the capturing ability of the short exposure field in the present diagram, that is, the pixel values of the short exposure field in the present dark area of the image are all zeros or less than a certain preset value. Therefore, the information in the dark area will be reconstructed by using the image information captured in the long exposure field. Comparatively, in FIG. 5, the bright areas of the image exceed the capturing ability of the long exposure field in the present diagram, that is, the pixel values of the long exposure field in the present bright area of the image are all 255 or greater than a certain preset value. Therefore, the information in the bright area will be reconstructed by using the image information captured in the short exposure field.

Figure 6:
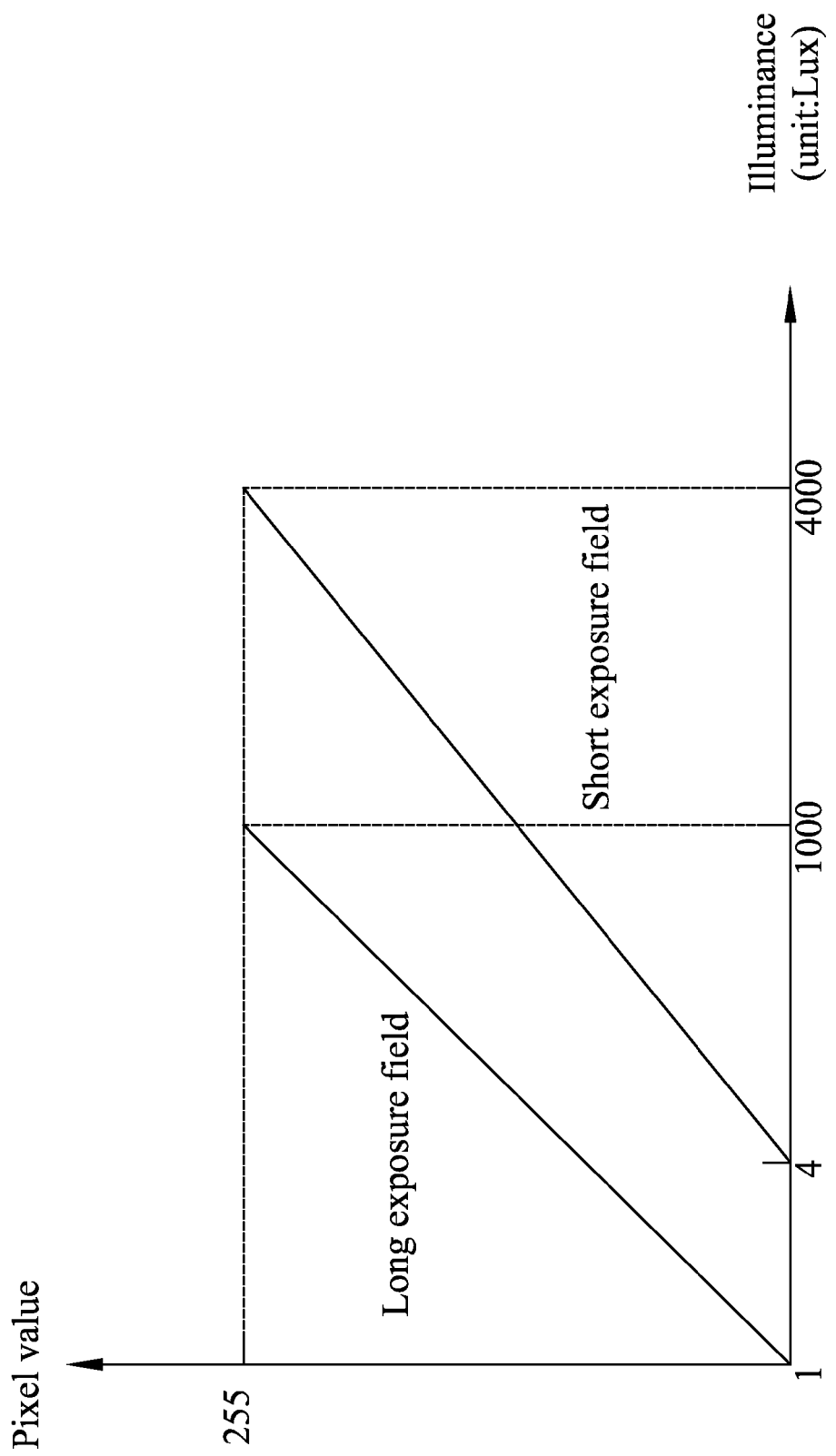
FIG. 6 is a diagram showing relationship between the illuminance and the pixels the long exposure field and the short exposure field according to the first embodiment of the present invention.

FIG. 6 is a diagram showing relationship between the illuminance and the pixels the long exposure field and the short exposure field according to the first embodiment of the present invention. For the benefit of explanation it is assumed that the digits of the image sensor is 8. Therefore, the maximum value of the pixel value is $2^8-1=255$. Moreover, it is also assumed that the exposure time ration R is 4, the illuminance which the long exposure field is able to capture is from 1 to 1000, and the corresponding pixel values are from 0 to 255 (assume that illuminance 1 to 1000 is within the capturing capability of the long exposure field, i.e., no loss of image details due to over-exposure or under-exposure). Since the exposure time ration R is 4, the illuminance which the short exposure field is able to capture is from 4 to 4000 (assume that illuminance 4 to 4000 is within the capturing capability of the short exposure field, i.e., no loss of image details due to over-exposure or under-exposure). The pixel value 0 to 255 of the long exposure field is linearly mapping to the illuminance 1 to 1000, and the pixel value 0 to 255 of the short exposure field is linearly mapping to the illuminance 4 to 4000. For the same pixel value, the illuminance of the short exposure field is 4 times to that of the long exposure field, while the pixel value of the long exposure field is 4 times to that of the short exposure field for the same illuminance. Therefore, suppose the original image sensor is able to capture the illuminance from 1 to 1000, the illuminance capturing capability of the present invention having the alternating-row image sensor can be expanded to 1 to 4000. In brief, suppose the dynamic range ratio of the original image sensor is D, then the dynamic range ratio of the high dynamic range image by using the present method may become R*D.

In a practical embodiment, the exposure time ratio R may be decided by the user. When the exposure time ratio R is already decided, the exposure time A can be decided by using an auto exposure mechanism of ordinary cameras. Based on A, the exposure time of the long exposure field and short exposure field can be increased or decreased, i.e., the mean value of the exposure time of the long exposure field and the short exposure field is equal to A. For example, suppose the exposure time ratio R is 3, then the exposure time of the long exposure field may be set to 1.5 Å, and the exposure time of the short exposure field may be set to 0.5 Å. Suppose the exposure time ratio R is 7, then the exposure time of the long exposure field may be set to 1.75 Å, and the exposure time of the short exposure field may be set to 0.25 Å.

Figure 7:
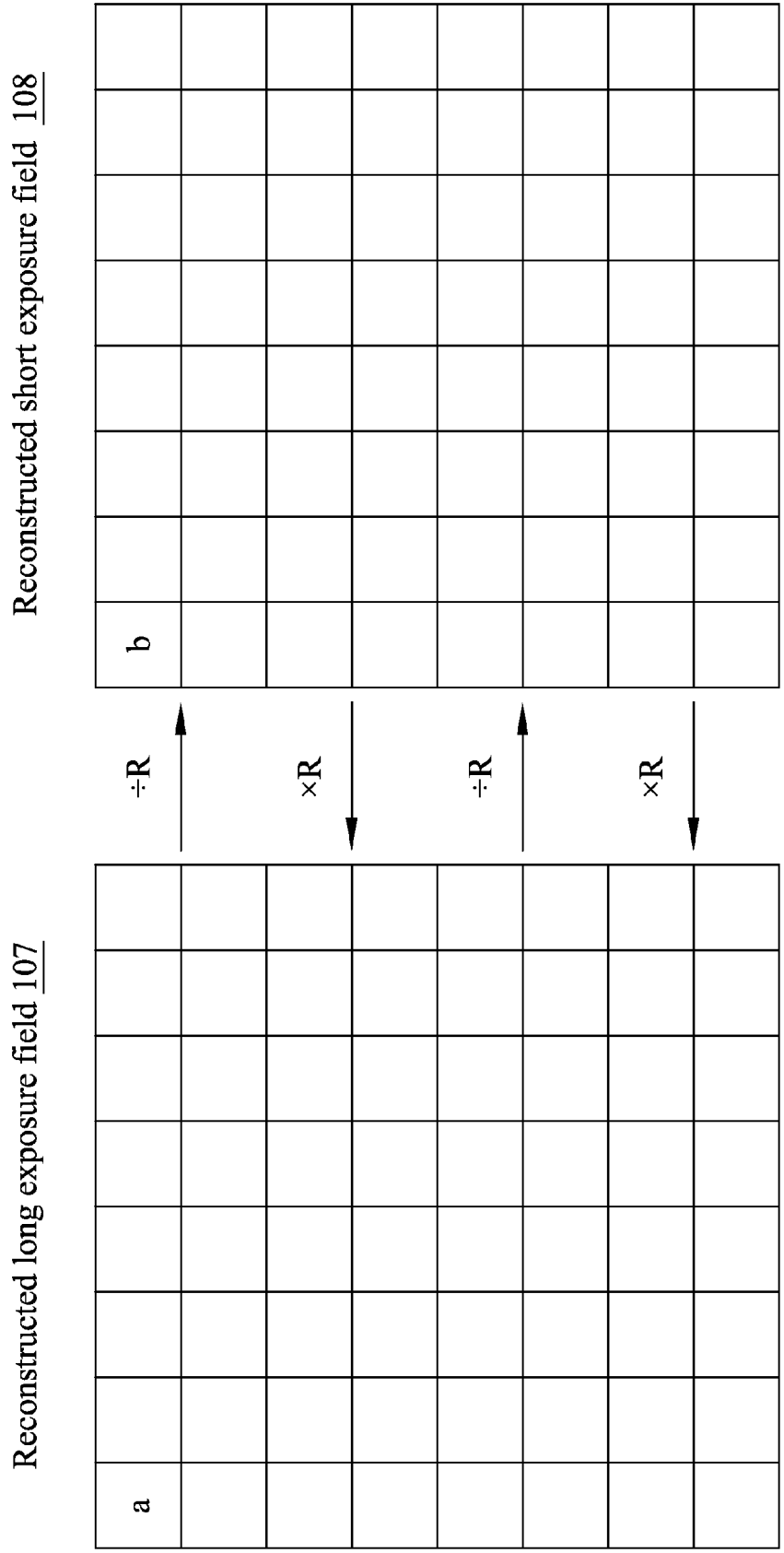
FIG. 7 is a diagram showing a reconstructed long exposure field and a reconstructed short exposure field according to the first embodiment of the present invention.

FIG. 7 is a diagram showing a reconstructed long exposure field and a reconstructed short exposure field having the same resolution as the original image according to the first embodiment of the present invention. Referring to FIG. 4, FIG. 5, FIG. 6, and FIG. 7. The reconstructed long exposure field 107 can be obtained by multiplying the pixel values of all the pixels of the short exposure field 106 (the first short exposure area 102 and the second short exposure area 104) and combining with the long exposure field 105 (the first long exposure area 101 and the second long exposure area 103), and the reconstructed short exposure field 108 can be obtained by dividing the pixel values of all the pixels of the long exposure field 105 (the first long exposure area 101 and the second long exposure area 103) and combining with the short exposure field 105 (the first short exposure area 102 and the second short exposure area 104). Due to that the long exposure field 105 and the short exposure field 106 are used in the reconstruction process of the present invention to reconstruct the missing parts of each other, the situation of reducing resolution will not happen. Different from the traditional image interpolation, the present method does not have the shortcomings of blurring or aliasing.

As shown in FIG. 7, the merging process is performed after the reconstruction process is completed i.e. the reconstructed long exposure field 107 (with the resolution 8×8) and the reconstructed short exposure field 108 (with the resolution 8×8) are obtained. The merging process includes the one by one comparison of the pixel value of each pixel of the reconstructed long exposure field 107 with the pixel value of each corresponding to pixel of the reconstructed short exposure field 108. To facilitate the understanding of the following illustration, assume the first pixel of the first row of the reconstructed long exposure field 107 is a, the first pixel of the first row of the reconstructed short exposure field 108 is b, the pixel value of the pixel a is assumed to be PV(a), and the pixel value of the pixel b is assumed to be PV(b). Due to the fact that an overly high pixel value or an overly low pixel value do not contain any information, a preset value can be set up for both situations, respectively. For example, the first preset value can be 250 and the second preset value can be 10 for the pixel value. When the pixel value exceeds the preset value 250, it means that the obtained information is false. When the pixel value is below the preset value 10, it means that the obtained information is false.

In summation of the above, five situations may happen during the merging process of the reconstructed long exposure field 107 with the reconstructed short exposure field 108: if PV(a) is greater than the first preset value 250, the illuminance of the present area is too high and exceeds the capturing capability of the reconstructed long exposure field 107, then PV(b)*R is used to replaced PV(a) to become the pixel value of the high dynamic range image. If PV(b) is less than the first preset value 10, the illuminance of the present area is too low and exceeds the capturing capability of the reconstructed long exposure field 107, then PV(a)/R is used to replaced PV(b) to become the pixel value of the high dynamic range image. If PV(a) is less than the second preset value 10, which means the illuminance of the present area using a long exposure duration is still too low. Therefore, the exposure time of the first long exposure area 101 and the second long exposure area 103 is extended to solve the overly bright problem of the present area. If PV(b) is greater than the first preset value 250, which means the illuminance of the present area using a short exposure duration is still too high. Therefore, the exposure time of the first short exposure area 102 and the second short exposure area 104 is shortened to solve the overly bright problem of the present area. If both PV(a) and PV(b) are between the second preset value 10 and the preset value 250, PV(a) is used as the pixel value of the high dynamic range image.

FIG. 4 can be referenced to illustrate the second embodiment of the present invention. The differences between the first embodiment and the second embodiment are the reconstruction process and the merging process, as explained below, after the formation of the long exposure field 105 and the short exposure field 106. As shown in FIG. 4, assume that the pixel values of the pixel c, d, e, f, g, h are PV(c), PV(d), PV(e), PV(f), PV(g), and PV(h). When the missing pixel g of the long exposure field is under reconstruction, the pixel value PV(e) of the pixel e is evaluated first. If PV(e) is less than a third preset value 10, it means that the pixel e does not contain any information, then (PV(c)+PV(d))/2 is used as the pixel value PV(g) of the pixel g. If PV(e) is between the third preset value 10 and a fourth preset value 250, then PV(e)*R is used as the pixel value PV(g) of the pixel g. When the pixel h of the reconstructed short exposure field is missing When the missing pixel h of the short exposure field is under reconstruction, the pixel value PV(d) of the pixel d is evaluated first. If PV(d) is greater than the fourth preset value 250, it means that the pixel h does not contain any information, then (PV(e)+PV(f))/2 is used as the pixel value PV(h) of the pixel h. If PV(d) is between the third preset value 10 and the fourth preset value 250, then PV(d)/R is used as the pixel value PV(h) of the pixel h. After all the pixels of the long exposure field 105 and the short exposure field 106 are filled up, the reconstruction process are finished.

In summation of the above, the alternating-row image sensor is used in the second embodiment of the present invention to shoot the original image of the long exposure area and the short exposure area. The second step is not directly using the pixel values of the short exposure field 106 to multiply R to fill up the pixel values of the corresponding pixels of the long exposure field 105, but evaluate if the pixel values of the short exposure field 106 are meaningful (the pixel values are from 10 to 250) first, then the pixel values of the short exposure field 106 are multiplied by R to fill up the pixel values of the corresponding pixels of the long exposure field 105. In this manner, it can be avoided that meaningless pixel values are used to perform the calculation and then the calculation outcome are still meaningless values. In other words, the reconstruction process and the merging process of the second embodiment are accomplished in a single step.

In summary, in the present invention a method of filming a high dynamic range video is disclosed to provide the user with the original image having a plurality of long exposure areas and a plurality of short exposure areas shooting by the alternating-row image sensor. The image information acquired in the long exposure areas is used to provide darker parts in the reconstruction process and the merging process, while the image information acquired in the short exposure area is used to provide brighter parts in the reconstruction process and the merging process. Suppose the dynamic range ratio of the original image sensor is D, then the dynamic range ratio of the high dynamic range image by using the present method may become R*D, where R is the exposure time ratio. It is noteworthy to note that the present method has the feature of low computation. Therefore, the user may display the shooting high dynamic range image in real time.

In summary, it is clear that the present invention has broken through the technical limitation of the prior arts and achieved the desired improvements. Moreover, the present invention is not easy to be conceived by those who skilled in this technical area. Apparently, the novelty and practicability of the present invention have met the application requirements of a patent.

The aforementioned preferred embodiment is to explain the technical ideas and features of the present invention. The purpose is to enable those who skilled in this technical area to understand the content of the present invention and realize it. It will be understood that the present invention is not limited to the details thereof. Various equivalent variations and modifications may still occur to those skilled in this art in view of the teachings of the present invention. Thus, all such variations and equivalent modifications are also embraced within the scope of the present invention as defined in the appended claims.

What is claimed is:

1. A method of filming a high dynamic range video, applied for an electronic product having an image sensor, and the method comprising the following steps:
   using the image sensor to capture an original image which is interlaced by a plurality of long exposure areas and a plurality of short exposure areas, and the original image comprising a plurality of pixels;
   forming the plurality of long exposure areas as a long exposure field, and forming the plurality of short exposure areas as a short exposure field;
   forming a reconstructed long exposure field and a reconstructed short exposure field having the same resolution as the original image based on a pixel value of each pixel of the long exposure field and the short exposure field via a reconstruction process; and
   applying the pixel value of each pixel of the reconstructed long exposure field and the reconstructed short exposure field to form a high dynamic range image via a merging process;
   wherein the pixel value is an integer within 0 to 2x−1 and x is a number of digits of the image sensor, different pixel values correspond to different levels of illuminance, and a ratio of a long exposure duration of the plurality of long exposure area to a short exposure duration of the plurality of short exposure area is a exposure duration ratio (R), and
   wherein the reconstruction process and the merging process comprise performing the following steps on each pixel of missing parts of the plurality of the long exposure areas:
   when a pixel value of a short exposure area, which is corresponding to a pixel of the missing parts of the plurality of long exposure areas, being less than a third preset value, an average of two pixel values, which is corresponding to the pixel of the missing parts of the plurality of long exposure areas, of previous and next long exposure areas being used as a pixel value of the pixel value of the missing parts of the plurality of long exposure areas; and
   when the pixel value of the short exposure area, which is corresponding to the pixel of the missing parts of the plurality of long exposure areas, being between the third preset value and a fourth value, the pixel value of the short exposure area being multiplied by R to replace the pixel value of the pixel of the missing parts of the plurality of long exposure areas.

2. The method of filming a high dynamic range video of claim 1, wherein each long exposure area comprises at least one row of pixels and each short exposure area comprises at least one row of pixels.

3. The method of filming a high dynamic range video of claim 1, wherein exposure time of the first row and the second row of the image sensor is the long exposure duration, and exposure time of the third row and the fourth row of the image sensor is the short exposure duration.

4. The method of filming a high dynamic range video of claim 1, wherein the reconstruction process comprises steps of:
   dividing the pixel value of each pixel of the plurality of the long exposure area by the exposure duration ratio (R) to fill up missing parts of the plurality of the short exposure area and combine with the plurality of the short exposure area to form the reconstructed short exposure field; and
   multiplying the pixel value of each pixel of the plurality of the short exposure area by the exposure duration ratio (R) to fill up missing parts of the plurality of the long exposure area and combine with the plurality of the long exposure area to form the reconstructed long exposure field.

5. The method of filming a high dynamic range video of claim 4, wherein the merging process comprises a one-by-one comparison of the pixel value of each pixel of the reconstructed long exposure field and the corresponding pixel value of each pixel of the reconstructed short exposure field, and perform the following steps based on the comparison result:
   replacing the pixel values of the reconstructed long exposure field by the pixel values of the reconstructed short exposure field multiplied by R to form the pixel values of the high dynamic range image when the pixel values of the reconstructed long exposure field are greater than a first preset value; and
   replacing the pixel values of the reconstructed short exposure field by the pixel values of the reconstructed long exposure field divided by R to form the pixel values of the high dynamic range image when the pixel values of the reconstructed short exposure field are less than a second preset value.

6. The method of filming a high dynamic range video of claim 5, wherein the merging process further comprises steps of:
   extending the long exposure duration of the plurality of the long exposure area when the pixel values of the reconstructed long exposure field are less than the second preset value;

shortening the short exposure duration of the plurality of the short exposure area when the pixel values of the reconstructed short exposure field are greater than the first preset value; and taking the pixel values of the reconstructed long exposure field as the pixel values of the high dynamic range image when the pixel values of the reconstructed long exposure field and the reconstructed short exposure field are all between the first preset value and the second preset value.

7. The method of filming a high dynamic range video of claim 6, wherein the first preset value is 250 and the second preset value is 10.

8. The method of filming a high dynamic range video of claim 1, wherein the reconstruction process comprises performing the following steps on each pixel of the missing part of the plurality of the short exposure areas:

when a pixel value of a long exposure area, which is corresponding to a pixel of the missing parts of the plurality of short exposure areas, being greater than a fourth preset value, an average of two pixel values, which is corresponding to the pixel of the missing parts of the plurality of short exposure areas, of previous and next short exposure areas being used as the pixel value of the pixel of the missing parts of the plurality of short exposure areas; and when the pixel value of the long exposure area, which is corresponding to the pixel of the missing parts of the plurality of short exposure areas, being between the third preset value and a fourth value, the pixel value of the short exposure area being divided by R to replace the pixel value of the pixel the missing parts of the plurality of short exposure areas.

9. The method of filming a high dynamic range video of claim 8, wherein the third preset value is 10 and the fourth preset values is 250.

* * * * *